United States Patent [19]
Lemonds et al.

[11] 3,726,460
[45] Apr. 10, 1973

[54] EXPLOSIVE BONDING DEVICE

[75] Inventors: Gary J. Lemonds, Broomfield; Ivor G. Hanson, Arvada, both of Colo.

[73] Assignee: Creative Metals Inc., Broomfield, Colo.

[22] Filed: July 29, 1971

[21] Appl. No.: 167,401

[52] U.S. Cl. ..................228/3, 29/470.1, 238/14.05
[51] Int. Cl. ..........................B23k 21/00, B23p 3/02
[58] Field of Search ..............29/470.1, 254, 421 E, 29/486, 497.5; 238/151, 14.05, 14.13, 14.14; 228/3

[56] References Cited

UNITED STATES PATENTS

| | | | |
|---|---|---|---|
| 2,830,768 | 4/1958 | Boaz | 238/14.05 |
| 2,834,551 | 5/1958 | Black | 238/14.13 |
| 2,893,640 | 7/1959 | Lowerre | 238/14.13 |
| 2,909,758 | 10/1959 | Modrey | 29/421 X |
| 3,140,539 | 7/1964 | Holtzman | 29/497.5 |
| 3,218,199 | 11/1965 | Cowan et al. | 29/421 UX |
| 3,366,334 | 1/1968 | Broske | 238/151 |
| 3,397,444 | 8/1968 | Bergmann et al. | 29/421 X |
| 3,495,778 | 2/1970 | Broske | 238/151 |
| 3,542,276 | 11/1970 | James | 228/3 |

*Primary Examiner*—J. Spencer Overholser
*Assistant Examiner*—Ronald J. Shore
*Attorney*—Ronald F. Weiszmann

[57] ABSTRACT

A bonding device for explosively bonding electrical conductors between disjointed rails, pipes or the like; a process for bonding electrical conductors onto rails, pipes or the like; and rails, pipes or the like bonded with electrical conductors.

5 Claims, 6 Drawing Figures

INVENTORS
GARY J. LEMONDS
IVOR G. HANSON

BY

ATTORNEY

EXPLOSIVE BONDING DEVICE

BACKGROUND INVENTION

1. Field of Invention

This invention relates to the field of bonding electrical conductors onto rails, pipes, or the like to provide for the conduction of electrical current in the form of stray voltage, communications or electricity between said rails, pipes or the like.

2. Prior Art

Substantial efforts have been made in the past to provide for conducting electricity between disjointed members such as rails, pipes, tubes, etc. Such methods have included fusion welding, clamping, or bolting electrical conductors between rail and pipe sections, and similar members. Typically, although rail and pipe sections may be connected they often have gaskets, gaps or other means between or separating their connected joints so as to completely interrupt or render the electrical flow sufficiently erratic as to require interconnecting electrical conductors. Rail bonds are of particular importance in mining operations where stray electrical current may cause premature detonation of explosives.

Many problems have arisen with regard to the methods known in the art. For example, continual loading of the rails, tends to weaken and eventually fracture fusion welded bonds; shear or loosen bolted and clamp bonds; and result in generally poor electrical connection. Fusion welds on pipes cause leakage and/or failure at welded areas. In addition, these methods require special treatment for maintenance, installation, repair and each joint has to be specially welded by a welder on site requiring large, cumbersome and bulky welding equipment and a substantial amount of time. Furthermore, heating of the rail or pipe by the welding process may seriously alter the basic metallurgical integrity resulting in subsequent metal failure or fatigue cracking.

Fusion bonding of pipes has presented further problems requiring the complete draining of air or water prior to bonding with its large associated expenses, difficulties and time involved.

In contrast to the bonds of the prior art, the present invention overcomes the disadvantages thereof and offers many unique and surprising advantages including reduced material, labor, installation, maintenance and repair expenses; consistent and reliable bonds, no heat during installation, excellent electrical properties, virtually no vibration or fatigue failure, no shear failure, no bulky equipment required for installation when desired, and no necessity of draining air or water from pipes. Further advantages will become evident in accordance with the following description.

SUMMARY OF DRAWINGS

In order to more fully describe the invention reference is not made to the accompanying drawings, wherein.

DETAILED DESCRIPTION OF DRAWING

Figure 1:
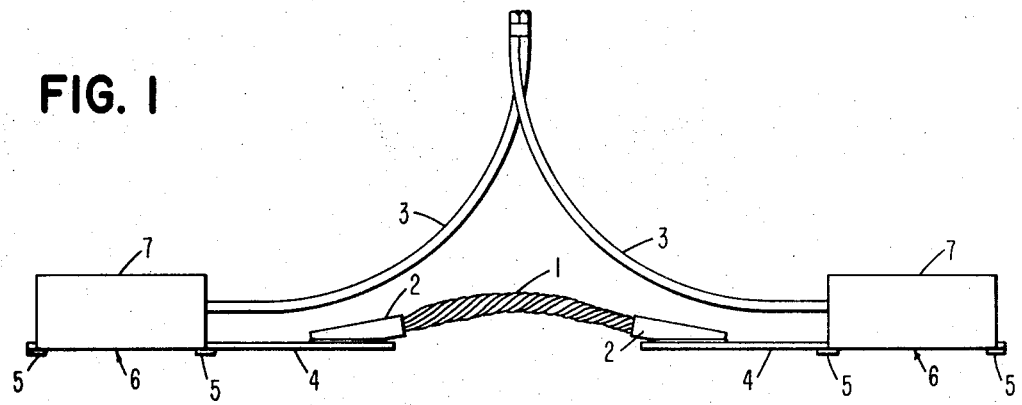
FIG. 1 is a side view of the bonding device prior to application to rail or pipe joints, or like members.

Referring to FIG. 1 the bonding device comprises an electrical conductor 1 preferably a copper wire or welding cable which has been inserted into copper tubing 2 crimped at both ends and thereby attached to said copper tubing; said copper tubing has been soldered with silver or soft solder or brazed with brazing alloys to bonding strips 4; attached to the bottom of the bonding strips on either side of the bonding surface are shims 5 to provide spacing between the bonding surface and the rail or pipe; across the bonding surfaces 6 of the bonding strips a protective tape is placed; charge containers 7 which are filled with explosive are attached to the bonding strips on the opposite side of the bonding surfaces and connected to detonating means 3.

Figure 2:
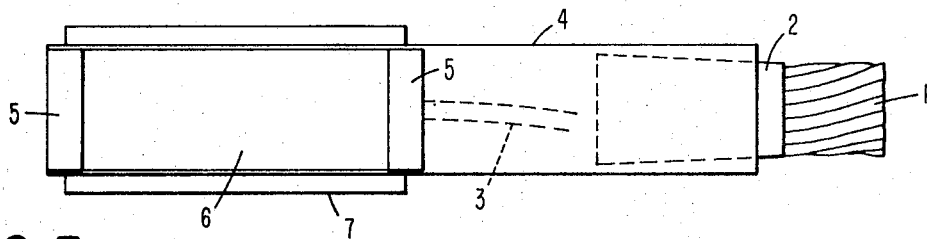
FIG. 2 is a bottom view of one or more of the bonding strips of the bonding device.

Referring to FIG. 2 the bottom view shows the shims 5 the bonding surface 6; the bonding strip 4; the electrical conductor 1 and the crimped copper tubing 2.

Figure 3:
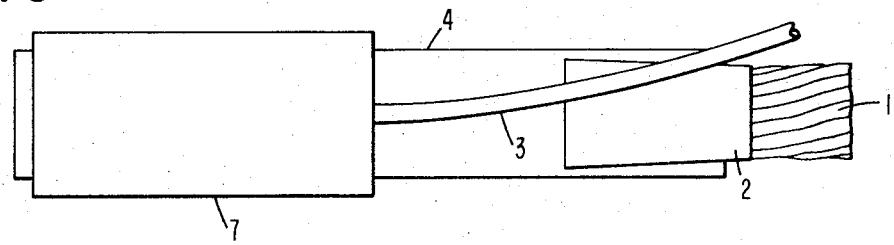
FIG. 3 is a top view of one or more of the bonding strips and the charge container of the bonding device.

Referring to FIG. 3 which shows the top view and the following portion of the bonding device; the charge container 7 the top of the bonding strip 4, the detonating means 3, the crimped copper tubing 2 and the electrical conductor 1.

Figure 4:
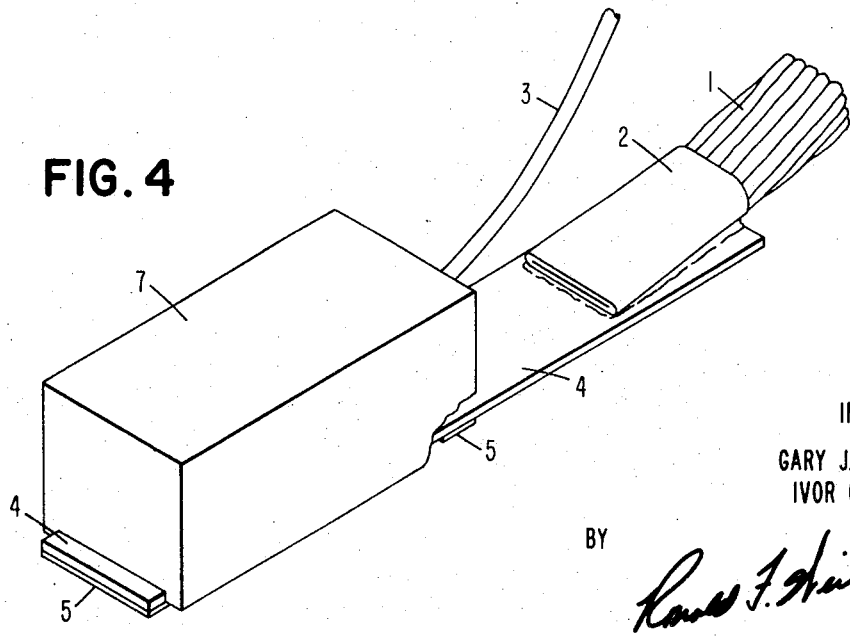
FIG. 4 is a perspective view of the charge container, bonding strip and electrical conductor of the bonding device.

In FIG. 4 the following items can be seen in the perspective view: charge container 7, detonating means 3, electrical conductor 1, copper tubing 2, shims 5, and bonding strip 4.

Figure 5:
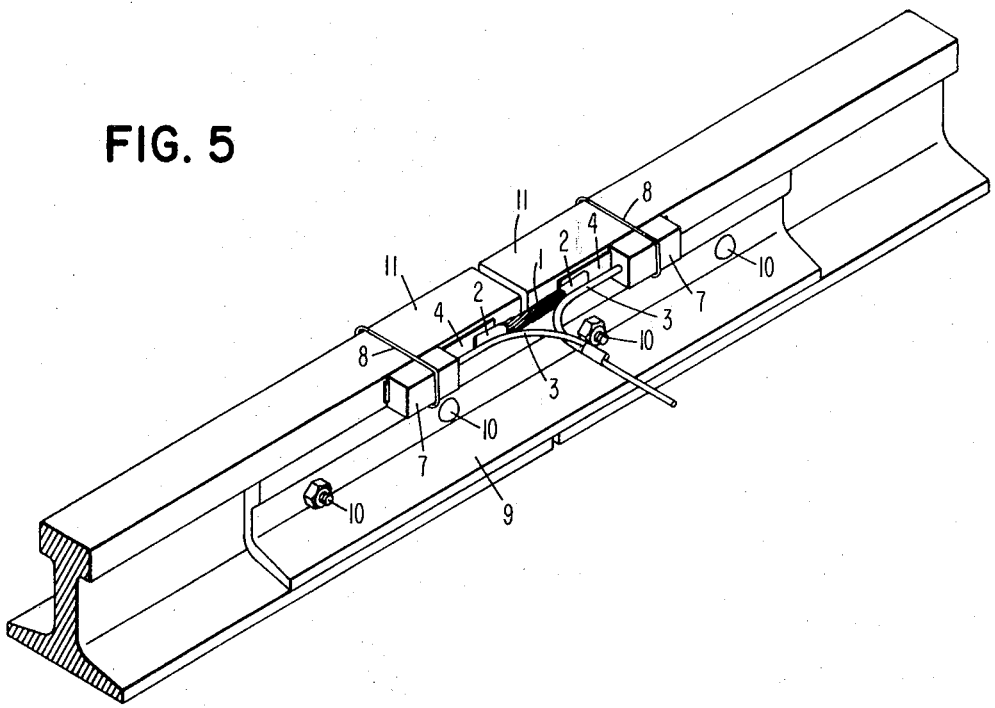
FIG. 5 is a view of the bonding device in place on a rail joint and ready for application.

Referring to FIG. 5 which shows the bonding device in place on a rail joint the following can be seen: disjointed rails 11 bolted together with angle bar 9 and track bolts 10; the bonding device is temporarily held in place by brackets 8 affixed to charge containers 7; other portions of the bonding device illustrated are bonding strips 4, electrical conductor 1, crimped copper tubing 2 and detonating means 3. Although illustrated on the side of the head of the rails the bonding device may be applied to the webbs, the base, or the base edge of the rails.

Figure 6:
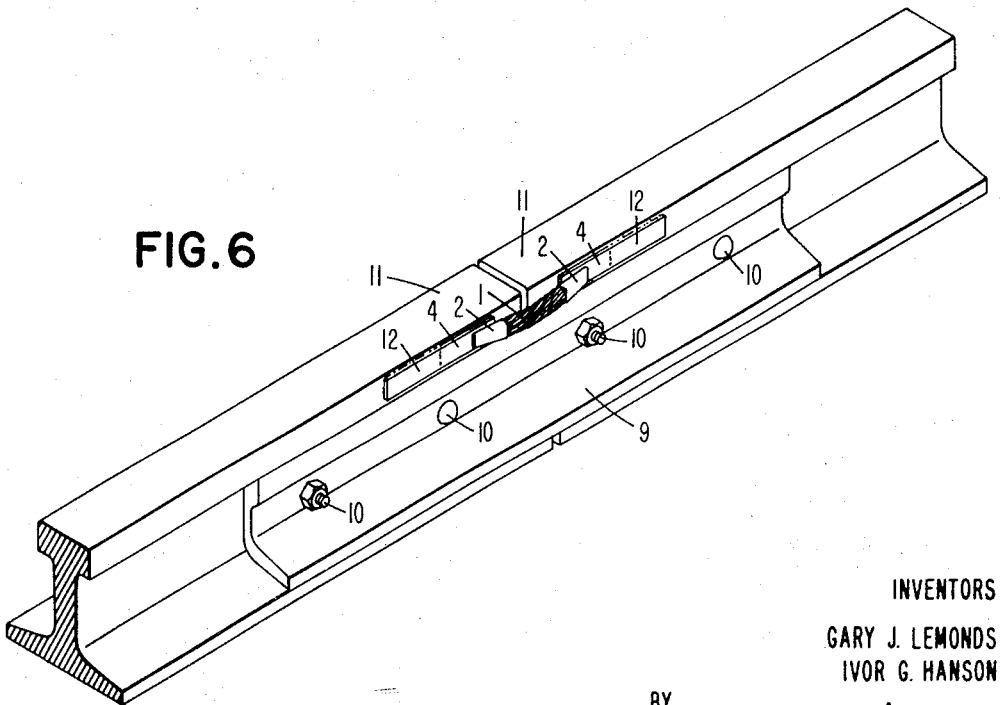
FIG. 6 is an explosively bonded rail joint.

Referring to FIG. 6 which shows an explosively bonded rail joint the following features are illustrated: disjointed rails 11 bolted together with angle bar 9 and track bolts 10; bonding strips 4 explosively bonded to rails 11 at 12; also shown is electrical conductor 1, and tubing 2.

DETAILED DESCRIPTION

As used herein the term "explosive bond" means a bond produced by the impact of metals together at sufficient velocities to form a solid state or metallurgical bond between the metals.

In using the bonding device the surface of the rail or pipe to be bonded is first prepared by grinding or finishing to a bright, clean finish. All scale, rust, pits, etc. on the area of the rail to be bonded must be removed and the surface must be clean and dry. After cleaning the surface on the rail or pipe the protective tape or covering is removed from the bonding surface of the bonding device, and the bonding surface is positioned over the cleaned area on the rail or pipe. Clamps, tape or other means are used to maintain the position during detonation. The bonding surfaces under the protective tape on the bonding strips should be clean and should not come in contact with the applicator's hands. If the surface is tarnished, it should be lightly sanded with Emery cloth or similar material.

After clamping the bonding device in place the detonating means is connected to a detonating device such as a fuse cap or electric cap to detonate the explosives previously placed and sealed in the charged container. Many bonding devices may be interconnected by means of detonating cord to the same detonator and detonated in one operation at the same time.

Usually suitable explosives for the charge container include dynamite, TNT, and plastic explosives which have a detonating velocity of at least 6,000 to 18,000 ft/sec and preferably 7,000 to 10,000 ft/sec. The velocities of the explosive must be less than the velocity of sound in the metals being bonded when the metals are positioned parallel.

The spacing devices or shims which separate the bonding surface from the rail or pipes should be at least 25 percent to 150 percent of the bonding strip thickness and preferably 25 percent to 80 percent of the bonding strip thickness to insure proper conditions for bonding. In general, greater or lesser space will result in faulty or poor bonds. Although the spacing devices need not be the same size, it is preferable so that the bonding surfaces are maintained in a parallel relationship with the surface being bonded. In general, the metals may be bonded without great difficulty at angles of 0° to 15°, however the greater the angle the less probability of a good bond and substantially parallel relationship is preferred.

In addition, it is more economical to manufacture shims of the same size for incorporation into the present invention. Shims of the desired size may be attached by appropriate adhesives to the bonding surface.

The bonding device may have one or more bonding surfaces interconnected by electrical conductors. Preferably up to No. 1 size copper cable or welding cable may be used for the conductors. When using larger size cables it is preferable to bond the strips to the rail first and then affix the cable to the bond by soldering, etc. Other materials may be used as conductors, but in that case it is preferred that suitable clamping or crimping means are provided for direct connection to the bonding surface. The conductors with or without clamping or crimping devices may be attached to the bonding strips by many methods known in the art, such as, silver solder, soft solder, brazing alloys, arc welding, or spot welding.

It is realized that although at least two bonding surfaces are required to complete an electrical circuit, the scope of this invention includes bonding devices which have only one bonding surface connected to an electrical conductor. These individual bonding surfaces once bonded to rails or pipes may be interconnected with acceptable electrical conductors of a temporary or permanent nature. These devices find excellent usage in rail switches and other areas when it is desirable to remove or change the electrical flow.

Such a bonding device is essentially illustrated by FIG. 3 which can be utilized as shown and electrical conductor 1 temporarily or permanently interconnected with a substantially identical device as shown in FIG. 3. Preferably all, but at least that portion of the bonding strips to be bonded are pretreated by annealing and then acid cleaning, or abrasive cleaning in order to prepare then for proper bonding. After treatment, protective tape or other covering means is applied to ensure that the surface remain clean and dry for application.

The charge containers are packed, sealed and permanently affixed to the bonding strips with at least 4 to 30 grams and preferably 10 to 15 grams of explosive per square inch of bonding surface. The explosive charge may vary with the thickness of the bonding strip, the type of object to be bonded and the metals involved. For example, when bonding to a thin-walled pipe, smaller explosive charges must be used in order to prevent excessive deformation of the pipe wall.

The bonding strip should be from 0.015 to 0.375 inches in thickness and preferably 0.060 to 0.080 inches in thickness. The metal thickness which can be bonded is related to the distance and angle between the surfaces, the velocity of the charge, amount of charge, size of surface and types of metals and surface irregularities involved. The bonding surface material can be copper, copper alloys, aluminum, or steel and is preferably copper or copper alloys.

The process of the present invention can be used to bond copper to steel, copper alloy to steel, aluminum to steel, stainless to steel, and steel to steel.

The term "disjointed" as used herein means two metal rails, pipes or the like which may or may not be connected and through which the flow of electrical currents may be so erratic or non existent as to require the interconnection thereof with an electrical conductor. For example, the term is intended to include cross-bonding across parallel rails which have no direct contact as well as rails jointed by angle bars and other means.

EXAMPLE 1

A bonding device as shown in FIG. 1 had charge containers with interior dimensions of seven-eighths inch by three-fourths inch by 2 inch, packed to a density of 15 g/cu. inch with dynamite (Trojamite C, Registered Trade Mark of Trojan Powder Co.) having a detonation velocity of 9,000 feet per second. The shim thickness was 0.035 to 0.038 inches and the bonding surface dimensions were 2 inch by 1 inch. The electrical conductor was 5 inch of size No. 1 welding cable. The bonding device was clamped to two disjointed 60 pounds (60 lbs/yd) steel rails which had been prepared by cleaning. The explosive charges were detonated by use of blasting caps. After detonation a strong explosive bond was formed. An amperage load of 800 amps for 5 minutes was applied across the electrical conductor of the bond and the conductor was warm to the touch.

EXAMPLE 2

The procedure of Example 1 was followed with similar bonding device except that the rail used was 90 pound rail (90 lbs/yd.).

EXAMPLE 3

A bonding device as shown in FIG. 1 had charge containers with interior dimensions of seven-eighths inch wide by three-fifths inch high and 1 5/8 inch. These containers were packed to the same density and with the same type explosive used in Example 1. The shim thickness was 0.035 to 0.038 inches and the bonding surface area was 1 inch by 1 5/8 inch. The conductor was 16 inch of No. 4 welding cable. The bonding device was taped across two connected steel pipes of 4½ inch outside diameter and 0.250 inch wall thickness. The explosive charges were detonated by use of blasting caps. After detonation a strong explosive bond to each pipe section was formed.

EXAMPLE 4

The procedure of Example 2 was followed except that six separate bonding devices were connected to the same detonating means and detonated simultaneously. After detonation strong explosive bonds to each rail were formed.

It is to be understood that the forms of the invention as shown herein and described are to be taken as the preferred embodiment. Various changes may be made in the shape, size and arrangements of parts and equivalent elements such as conductors, metals, adhesives, explosives, charge containers, etc. may be substituted for those illustrated and described herein without departing from the scope and objectives of this invention.

We claim:

1. An explosive bonding device for bonding together disjointed metal pieces for the conduction of electricity comprising
    a. one or more metal bonding strips;
    b. one or more electrical conductors attached to each of said metal bonding strips;
    c. one or more spacing means attached to the bonding surface portion of each of the bonding strips;
    d. at least one explosive charge means attached to each of the bonding strips on the opposite side of said bonding surface; and
    e. one or more explosive detonating means connected to each of said charges.

2. An explosive bonding device as in claim 1 comprising:
    a. two or more separate bonding strips interconnected by an electrical conducting means;
    b. two or more spacing means attached to each bonding surface of said bonding strip;
    c. at least one charge means for each bonding surface and;
    d. an explosive charge detonating means connected to each charge.

3. An explosive bonding device as in claim 2 wherein
    a. the bonding strips are prepared from metals selected from the group consisting essentially of copper, copper alloys, aluminum, steel and stainless steel having a thickness of from 0.015 to 0.375 inches;
    b. the bonding strips are electrically interconnected by copper cable;
    c. the spacing means maintain the bonding surfaces a distance of at least 25 to 150 percent of the thickness of the bonding strip apart from the surface to be bonded;
    d. the explosive charge is an explosive having a detonation velocity of at least 6,000 to 18,000 ft./sec.; and
    e. the detonating means is selected from the group consisting of detonating cord, electrical blasting caps and fuse blasting caps.

4. A bonding device as in claim 3 wherein
    a. the bonding strips are annealed copper strips having a thickness of from 0.060 to 0.080 inch.
    b. the explosive charge is packed to a density of from 4 to 30 gms/cu. inch in charge containers permanently affixed to said bonding strips;
    c. the bonding surface is covered with a protective means; and
    e. the spacing means are substantially the same size.

5. A bonding device as in claim 4 wherein
    a. the spacing means are from 25 to 80 percent of the bonding strip thickness;
    b. the explosive charge is packed to a density of 10 to 15 gms/cu inch per square inch of bonding surface; and
    c. the explosive charge is an explosive having a detonation velocity of at least 6,000 to 10,000 ft./sec.

* * * * *